United States Patent
Barclay et al.

(10) Patent No.: US 8,484,795 B2
(45) Date of Patent: Jul. 16, 2013

(54) COLLECTING DEBRIS FROM A TOOL

(75) Inventors: Chad Francis Barclay, Jordan, MN (US); Joseph Charles Lutz, Longmont, CO (US); Kok Wah Jackie Tan, Singapore (SG); Kok Loong Teng, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 352 days.

(21) Appl. No.: 12/854,527

(22) Filed: Aug. 11, 2010

(65) Prior Publication Data

US 2012/0036674 A1    Feb. 16, 2012

(51) Int. Cl.
*A47L 9/00*    (2006.01)

(52) U.S. Cl.
USPC .......................................... 15/300.1; 15/339

(58) Field of Classification Search
USPC 15/300.1, 301, 314, 415.1, 339, 344; 83/100; 408/67; 451/456
See application file for complete search history.

(56) References Cited

U.S. PATENT DOCUMENTS

| | | | |
|---|---|---|---|
| 2,548,314 A * | 4/1951 | Kinney, Sr. .................... | 408/67 |
| 5,138,390 A | 8/1992 | Miyabayashi et al. | |
| 5,227,844 A | 7/1993 | Bhattacharjee et al. | |
| 5,235,485 A | 8/1993 | Martin | |
| 5,273,329 A | 12/1993 | Wessel | |
| 5,356,245 A * | 10/1994 | Hosoi et al. .................... | 408/56 |
| 5,401,111 A | 3/1995 | Nubson et al. | |
| 5,423,411 A | 6/1995 | Kennett | |
| 5,519,910 A | 5/1996 | Messina | |
| 5,811,184 A | 9/1998 | Anderson et al. | |
| 5,891,259 A | 4/1999 | Ikeda et al. | |
| 6,001,472 A | 12/1999 | Ikeda et al. | |
| 6,118,289 A | 9/2000 | Kitani et al. | |
| 6,175,984 B1 | 1/2001 | Prime et al. | |
| 6,200,075 B1 * | 3/2001 | Gaskin et al. ................... | 408/67 |
| 6,582,141 B2 | 6/2003 | Meier et al. | |
| 6,615,435 B2 | 9/2003 | Randall | |
| 6,646,455 B2 | 11/2003 | Maekawa et al. | |
| 6,741,086 B2 | 5/2004 | Maekawa et al. | |
| 6,744,592 B2 | 6/2004 | Randall | |
| 6,775,879 B2 * | 8/2004 | Bibeault et al. .............. | 15/306.1 |
| 6,777,966 B1 | 8/2004 | Humphrey et al. | |
| 6,781,395 B2 | 8/2004 | Maruyama et al. | |
| 6,884,300 B2 | 4/2005 | Sato et al. | |
| 6,888,344 B2 | 5/2005 | Maekawa et al. | |
| 7,101,033 B2 | 9/2006 | Roche et al. | |
| 7,281,886 B2 * | 10/2007 | Stoerig ........................... | 408/67 |
| 7,396,193 B2 * | 7/2008 | Kesten ............................ | 408/67 |
| 7,797,794 B2 * | 9/2010 | Bleicher et al. .............. | 15/415.1 |
| 2004/0093682 A1 * | 5/2004 | Litomisky et al. .............. | 15/314 |
| 2005/0000052 A1 | 1/2005 | Byles | |
| 2005/0047880 A1 * | 3/2005 | Seely .............................. | 408/67 |
| 2005/0281627 A1 * | 12/2005 | Britz ............................... | 408/67 |
| 2008/0050193 A1 * | 2/2008 | Gamboa et al. ............... | 409/137 |
| 2009/0076656 A1 | 3/2009 | Lutz et al. | |

* cited by examiner

*Primary Examiner* — Brian Glessner
*Assistant Examiner* — Beth Stephan
(74) *Attorney, Agent, or Firm* — Mitchell K. McCarthy

(57) ABSTRACT

An apparatus and associated method are provided for collecting debris from a tool. A housing defines a channel, at least one of the tool and the housing being selectively movable to operably orient the tool at a predefined reference relationship to the channel. A magnetic member is operable to demagnetize at least one of the tool and the debris. A windage source in fluid communication with the channel is operable to establish a windage contacting the tool to cooperate with the magnetic member in removing the debris from the tool. A conduit connected to the channel collects the removed debris.

20 Claims, 10 Drawing Sheets

COLLECTING DEBRIS FROM A TOOL

SUMMARY

In some embodiments an apparatus is provided for collecting debris from a tool. The apparatus has a housing defining a channel, at least one of the tool and the housing being selectively movable to operably orient the tool at a predefined reference relationship to the channel. The apparatus also has a magnetic member that is operable to demagnetize at least one of the tool and the debris. The apparatus further places the channel in fluid communication with a windage source that is operable to establish a windage contacting the tool to cooperate with the magnetic member in removing the debris from the tool. The apparatus further has a conduit connected to the channel to collect the removed debris.

In some embodiments a method is provided for collecting debris from a tool. The method includes the steps of obtaining a debris collection apparatus having a housing that defines a channel sized to admit the tool; moving at least one of the tool and the housing along a path of travel to orient the tool at a predefined reference relationship to the channel; activating an electrical coil that is adjacent the channel to demagnetize at least one of the tool and the debris; activating a windage source that is in fluid communication with the channel to establish a windage contacting the tool, the activating steps cooperatively removing the debris from the tool; and after the activating steps, collecting the removed debris.

In some embodiments an apparatus is provided that collects debris from a tool. The apparatus has a housing having a demagnetizer and connected to a windage source, and a means for controlling activation of the demagnetizer and the windage source in relation to a movement of at least one of the housing and the tool to collect the debris from the tool.

DESCRIPTION

Manufacturing lines have generally evolved through the application of highly sophisticated automation devices and methods. Gains in productivity have been realized as past reliance on human judgment and manipulation is replaced by processor-driven systems. The repeatability of such systems enables the throughput velocity of components to be maximized.

Along with maximizing throughput, there has been a general trend toward performing both fabrication and testing operations at the point of final assembly, rather than building batches of subassemblies ahead of the time they are needed. By scheduling as many parts as possible to be ready "just in time" for final assembly, the utilization of all production equipment supporting final assembly is maximized.

However, these practices inevitably raise some problematic issues that cannot be ignored. For example, fabrication and assembly operations can create debris that, if not controlled, can damage sensitive components. With the continued demand for automated manufacturing lines having ever higher levels of throughput performance, there remains a continual need for improvements in the manner in which such debris is controlled.

Figure 1:
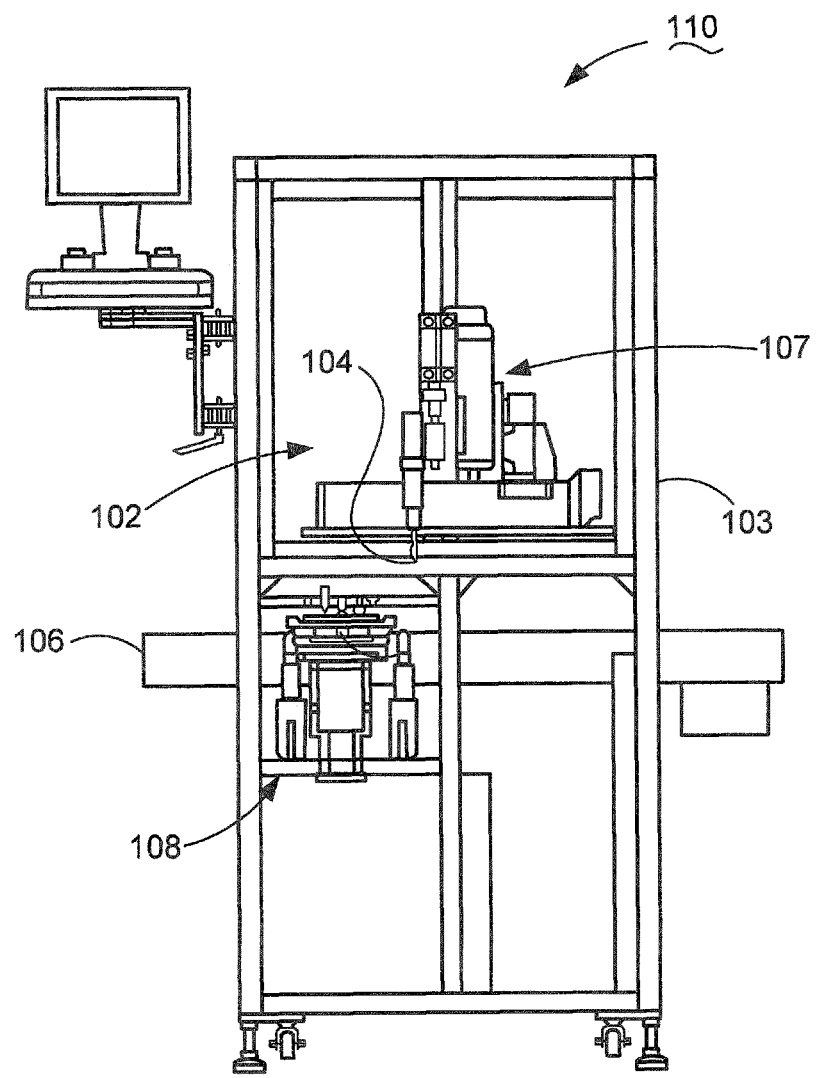
FIG. 1 is a machine cell that is constructed in accordance with embodiments of the present invention.

FIG. 1 depicts a machine cell 100 that is described in detail in U.S. Pat. No. 6,681,659 which is assigned to the present assignee, useful as being illustrative of an environment that is readily adaptable for using embodiments of the present invention, and as such is incorporated by reference in its entirety herein. The machine cell 100 is illustrative of a modular approach wherein a plurality of such cells are joined together to form a manufacturing system, although the present embodiments are not so limited. Particularly, the machine cell 100 is built upon a frame 103 having rollers to facilitate moving the machine cell 100 into and out of a manufacturing line, or to rearrange the machine cell 100 among other cells as is desired for running different workpieces down the system. Support mounts are extendible to operably lift the frame 103 off the rollers and to level the frame. A conveyor section 106 can be placed at a standardized elevation in each of adjacent cells to provide a continuous transport system for presenting the workpieces to each of the tools in the respective cells.

The machine cell 100 generally supports a tool arrangement 102 that performs manufacturing and/or assembly operations on a workpiece presented to it. A lift 108 raises the workpiece from the conveyor 106 and orients it for processing.

In these illustrative embodiments the tool arrangement 102 includes a driver tool 104 that is selectively moveable and extensible by a programmable three-axis positioner 107 to attach one or more fasteners to the workpiece, although the claimed embodiments are not so limited to such a driver tool.

However, in the normal course of repeated contacting engagement with the fasteners, the driver tool 104 can collect debris which must be controlled so as to not end up contaminating the workpiece. In the illustrative embodiments of the cited patent where the workpiece is a data storage device, without adequate control the debris can dislodge from the driver tool 104 and ultimately end up inside the data storage device enclosure. There are a number of opportunities for debris trapped inside the enclosure to degrade the performance of the data storage device, if not cause an outright failure mode. For instance, debris can damage sensitive printed circuit board components or precision bearing surfaces, or it can become wedged between the transducer and the data storage medium causing the loss of stored data and/or damage to the transducer and the storage medium.

Figure 2:
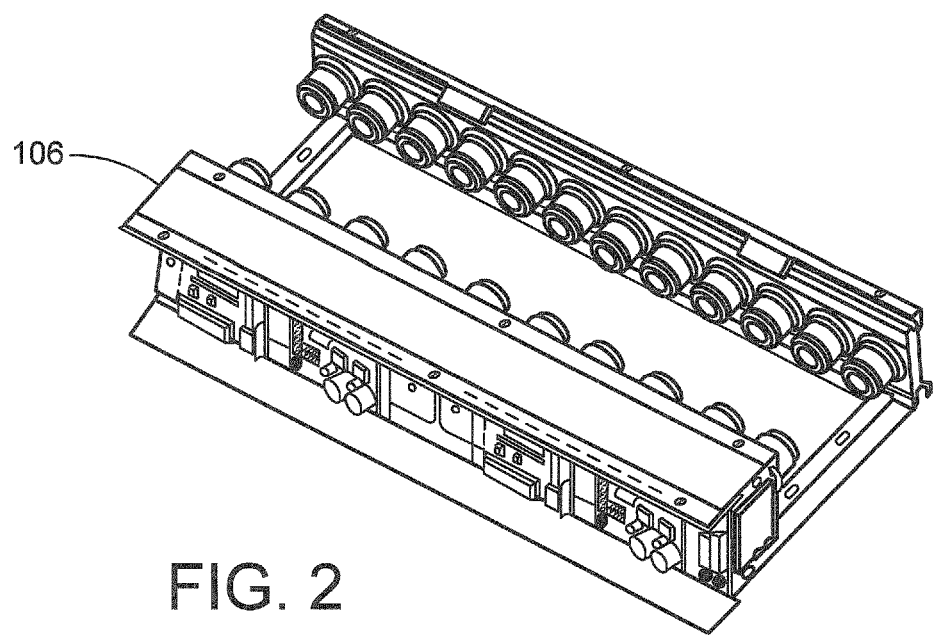
FIG. 2 is an isometric view of the conveyor in the machine cell of FIG. 1.
Figure 3:
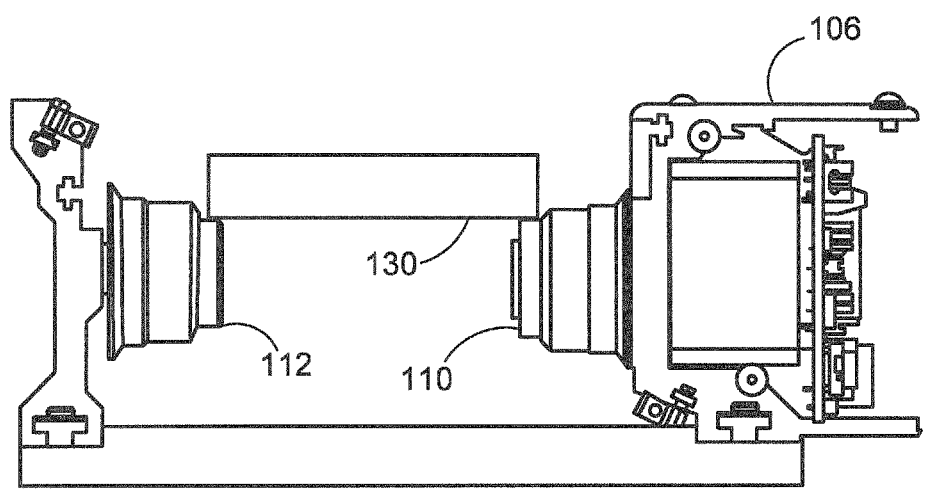
FIG. 3 is an elevational view of a workpiece supported on the conveyor of FIG. 2.

FIG. 2 is an isometric view and FIG. 3 is a corresponding end view of the conveyor 106, which in these illustrative embodiments is an intelligent zero pressure accumulation conveyor with flexible zone size capability, such as is described in detail in U.S. Pat. Nos. 6,460,683 and 6,729,463 which are assigned to the present assignee and incorporated by reference in their entirety herein. It will be noted that each of the powered rollers 110 and each corresponding freewheeling roller 112 is stepped for accommodating different size pallets.

Figure 4:
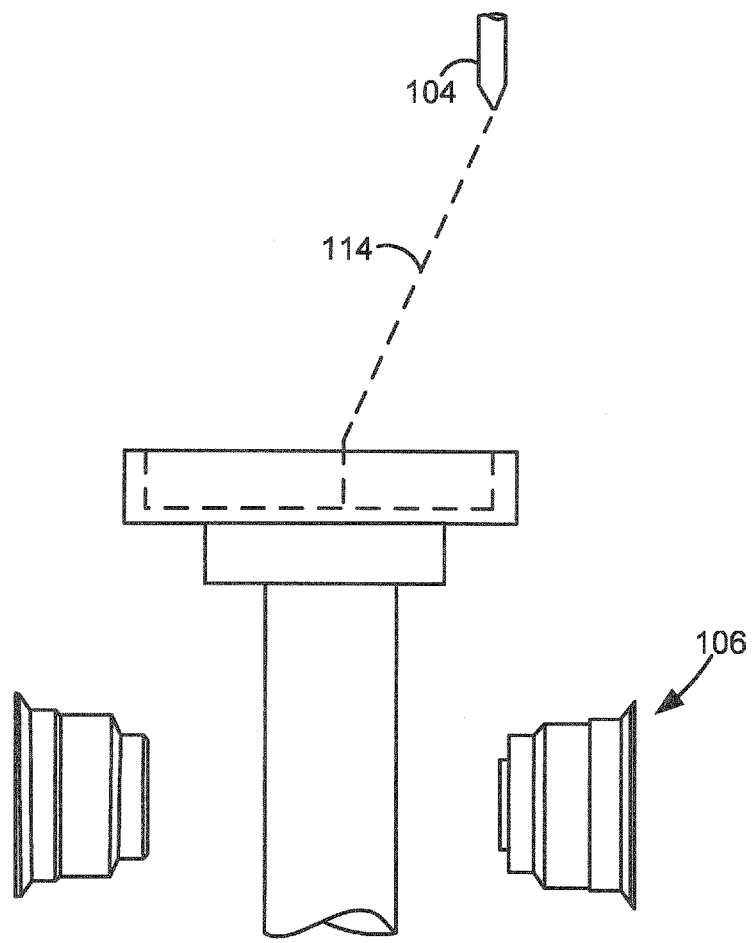
FIG. 4 diagrammatically depicts the machine cell of FIG. 1 directing a driver tool along an operative path to perform processing steps on the workpiece.
Figure 5:
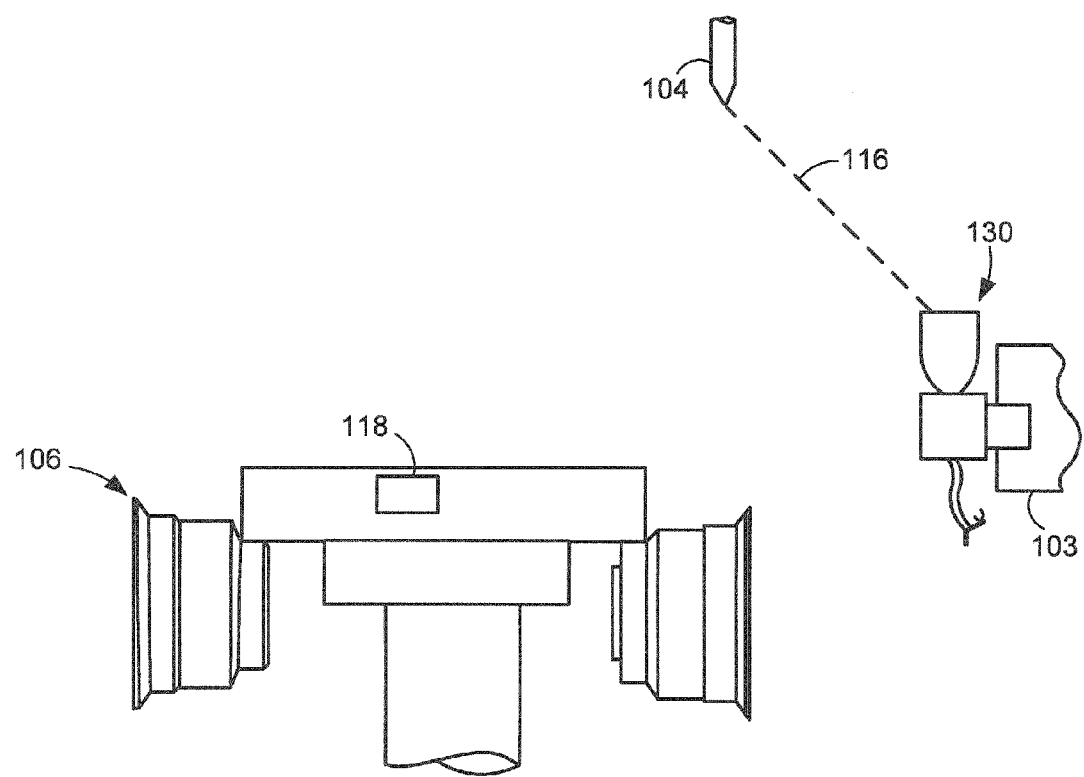
FIG. 5 diagrammatically depicts the machine cell of FIG. 1 directing the driver tool along an alternative path to collect debris from the driver tool.

FIGS. 4 and 5 are comparisons of an operative tool path 114 and an alternative tool path 116 that are selectively imparted by a control system of the machine cell 100 (FIG. 1) to the driver tool 104. The operative tool path 114 is for processing a workpiece and the alternative tool path 116 is for collecting accumulated debris from the driver tool 104. It will be noted that in the diagrammatic depictions both the operative path 114 and the alternative path 116 are two-dimensional paths having lateral and vertical components of trajectory. In reality, the paths 114, 116 can have more or fewer such components of trajectory.

The machine cell 100 control system can be programmed to switch from the operative tool path 114 to the alternative tool path 116 in relation to the number of processing cycles that have occurred since the last debris collection cycle. Alternatively, the control system can adaptively communicate with a transmitted signal from a media 118, such as a radio frequency identification (RFID) tag or bar code and the like, to control whether or not a debris collection cycle is performed before processing the next workpiece. Preferably, any such automated sequencing can be manually overridden if a visual observation determines that a debris collection cycle is needed. Again, although the driver tool 104 in FIGS. 4 and 5 depicts something akin to a driver bit or a probe, the present embodiments certainly are not so limited and in alternative equivalent embodiments debris can be collected from any type of end effector in accordance with the present embodiments.

Figure 6:
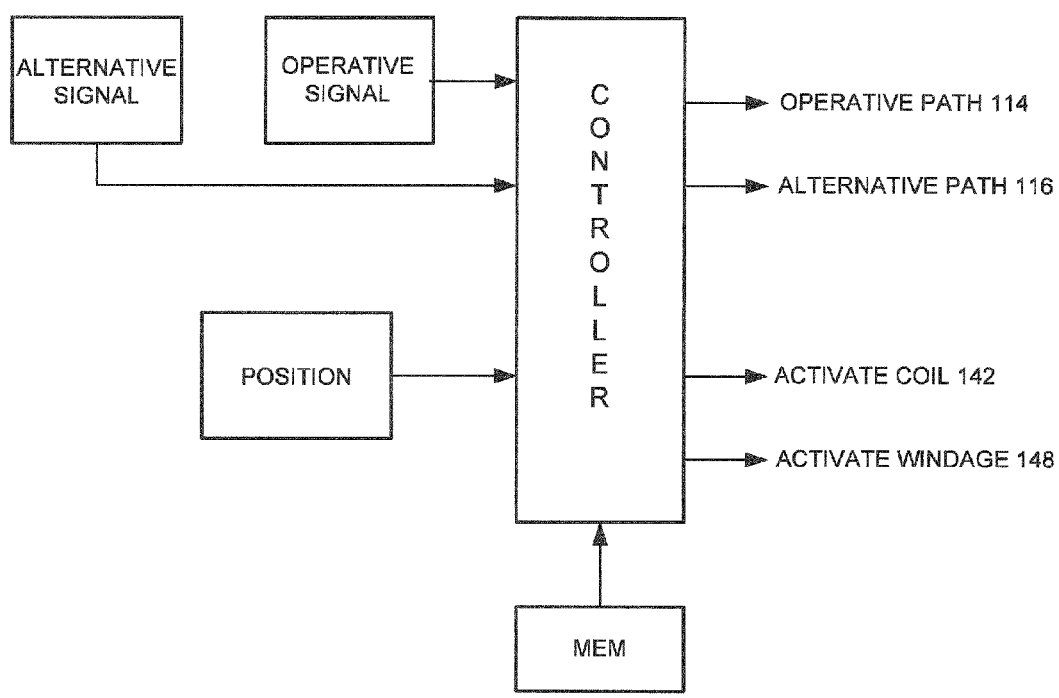
FIG. 6 is a functional block diagram of a portion of the operational control system of the machine cell in FIG. 1.

FIG. 6 is a functional block diagram of a pertinent portion of the control system in the machine cell 100 (FIG. 1). As discussed above, a processor based controller 119 executes programming instructions stored in memory 120 to move the driver tool 104 either according to the predetermined operative tool path 114 or the predetermined alternative tool path 116 (FIGS. 4 and 5). The controller 119 is responsive to an operative cycle signal 122 calling for the operative tool path 114, and alternatively responsive to a debris collect signal 124 calling for the alternative path 116.

By integrating the callings for the alternative tool path 116 into the normal production processing, the debris collection from the driver tool 104 can advantageously be performed without the penalty of setup delays in production after collecting debris. Particularly, collecting the debris from the driver tool 104 without the need for removing the driver tool 104 from its supporting structure in the tool arrangement 102 eliminates tool setup delay following resumption of production after collecting debris.

The amount of debris collected from the driver tool 104 can be monitored and used in a statistical approach to adaptively determine the frequency with which the debris collect signal 124 is sent, or alternatively deciding when to shut down the production line for a more rigorous cleaning procedure. Furthermore, the debris collected can be analyzed to determine its origin, and that information is useful in root cause determination for continually reducing the introduction of debris into the production process.

Figure 7:
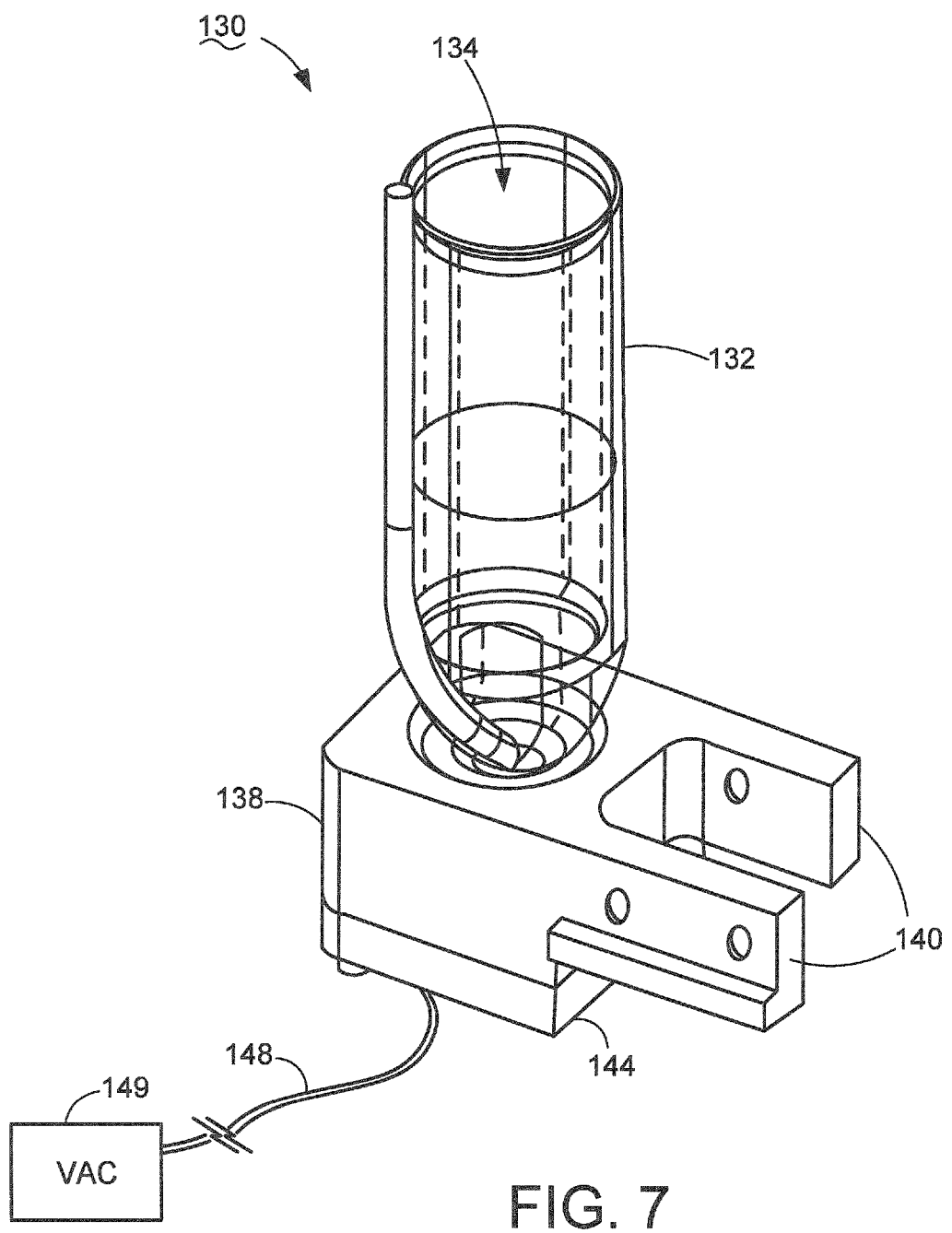
FIG. 7 is an isometric depiction of the debris collection apparatus of FIG. 5.
Figure 8:
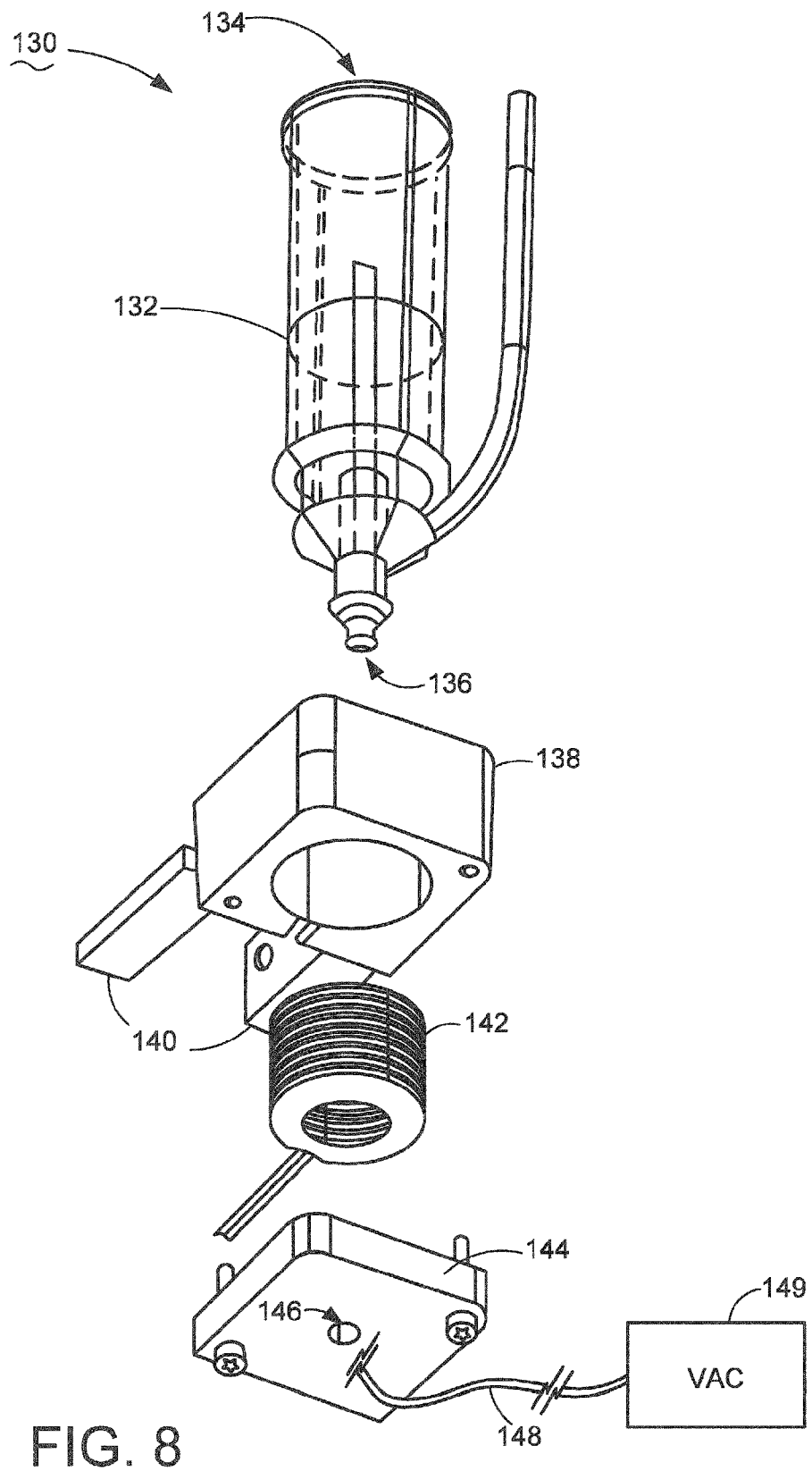
FIG. 8 is an exploded isometric depiction of the debris collection apparatus of FIG. 7.

Returning momentarily to FIG. 5, the driver tool 104 is directed along the alternative tool path 116 to a debris collection apparatus 130 that is constructed in accordance with embodiments of the present invention. FIG. 7 is an isometric depiction of the debris collection apparatus 130, and FIG. 8 is an exploded isometric depiction thereof from a different perspective. The apparatus 130 has a housing 132 defining an open end 134 for admitting the driver tool 104. At an opposing end the housing 132 defines a narrowed channel 136 into which the driver tool 104 is oriented by the alternative tool path 116 ultimately to a predefined reference relationship for collecting the debris. The housing 132 is supported by a mounting block 138 having protuberant flanges 140 for attaching the mounting block 138 to the frame 103 (FIG. 1). An electrical coil 142 is nested in the mounting block 138, its multiple windings annularly disposed, preferably concentrically, around the channel 136. Electrically energizing the coil 142 with an alternating current serves a degaussing function to demagnetize at least one of the driver tool 104 and the debris on the driver tool 104, depending on the exposure to the degaussing voltage, to aid in removing the debris from the driver tool 104.

A cover 144 is attached to the mounting block 138 and has an aperture 146 in fluid communication with the channel 136. A conduit 148 sealingly engages the aperture 146 at one end thereof and is connected to a windage source 149 at the other end thereof. In these illustrative embodiments the windage source 149 is a vacuum pump that draws the windage through the channel 136 to impinge the debris on the driver tool 104 and thereby, in cooperation with the aid of the demagnetizing effect of the degaussing coil 142, dislodge the debris from the driver tool 104. The conduit 148 directs the dislodged debris to a containment reservoir such as in the conduit 148 itself or in the windage source 149 where it is filtered from the windage for a controlled disposal thereof.

Returning momentarily to FIG. 6, the controller 119 also monitors the instantaneous tool position from a signal 125 obtained from the positioner 107 (FIG. 1) as the control system moves the driver tool 104 along the alternative path 116. The controller 119 is programmed to selectively activate the electrical coil 142 and the windage source 149 in relation to the position signal 125. For example, in the embodiments discussed so far, the driver tool 104 enters the housing 132 and proceeds vertically downward toward the channel 136. In that case, the controller 119 can advantageously be programmed to energize the windage source 149 before the driver tool 104 reaches the electrical coil 142, because any debris that is dislodged from the driver tool 104 after it has entered the housing 132 will be captured by the funnel shaped housing 132. Thus, in these illustrative embodiments it can be advantageous for the controller 119 to activate the coil 142 and the windage source 148 independently of each other; more particularly, by activating one of them before the other, and perhaps before the driver tool 104 has completed traversing the alternative path 116.

Figure 9:
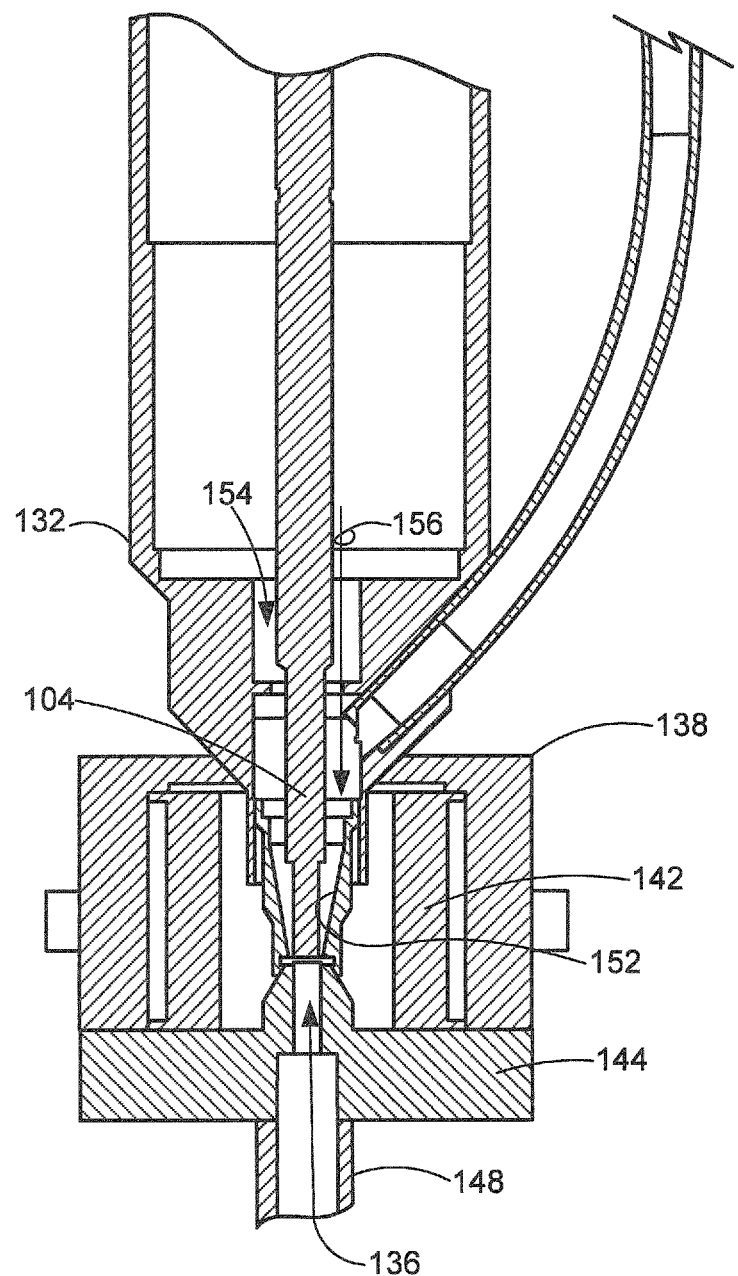
FIG. 9 is a cross-sectional depiction of a portion of the debris collection apparatus of FIG. 7.

FIG. 9 is a cross sectional depiction of the driver tool 104 operably disposed at the predefined reference relationship in the channel 136 that is suited for collecting the debris from the driver tool 104. The channel 136 is defined by a surface 152 that establishes a close mating relationship adjacent the driver tool 104 in that operable orientation. By "close mating relationship" it is meant that there is a relatively small clearance between the surface 152 and the outermost surface of the driver tool 104. This does not mean, however, that the surface 152 is necessarily equidistant to a peripheral surface of the driver tool 104. For example, without limitation, the surface 152 as depicted defines a circular bore at a longitudinal cross section, which is well suited for use with the radially multi-pointed configuration of a Torx® brand driver bit. It will also be noted that the surface 152 is preferably conically shaped along a longitudinal axis so that the close mating relationship is most significant at the distal end of the channel 136. That effectively provides a nozzle that progressively increases the windage velocity to likewise increase the force with which the windage removes the debris from the driver tool 104. To lessen the conditions causing turbulence, an inlet 154 for admitting the windage into the channel 136 is preferably disposed upstream of the conical surface 152 a sufficient distance that permits the windage flow to fully develop and straighten by flowing parallel to a longitudinal axis of the driver tool 104, as indicated by the reference arrow 156, before being pressurized by the reduced flow area created by the conical surface 152.

The controller 119 activates the coil 142 and the windage source 148 for predetermined dwell times that are established for reliably removing the debris from the driver tool 104. When debris collection is complete, the positioner 107 withdraws, or disorients, the driver tool 104 from the predefined reference relationship in the channel 136 for further processing on one or more workpieces. The return tool path can be the reverse of the alternative tool path 116, or it can be a different path than the reverse of the alternative tool path 116. For example, where processing a workpiece involves moving the driver tool 104 to four locations of the workpiece, the alternative tool path 116 can be from the fourth location of a workpiece to the debris collection apparatus 130, and the return tool path can be from the debris collection apparatus 130 to the first location of the next workpiece.

The foregoing illustrative embodiments relate to the driver tool 104 being moveable laterally and vertically downward to the stationary debris collection apparatus 130; in other words, a moveable driver tool 104 directed downward. In alternative equivalent embodiments the driver tool 104 can be moveable laterally and vertically upward to a stationary debris collection apparatus; in other words, a moveable driver tool directed upward. In that case, gravity would cause debris not collected by the debris collection apparatus to fall away uncontrolled. For that reason, it can be advantageous for the controller 119 to not activate the windage source until the driver tool has arrived at the operable orientation in the channel to improve the likelihood that dislodged debris is collected by the debris collection apparatus. Also, in that case after the driver tool has arrived it can be advantageous to first activate the windage source to urge the debris in an upward direction, then activate the degaussing coil to aid is removing the debris from the driver tool. In yet other alternative equivalent embodiments the driver tool can be stationary, either directed upward or downwardly, and the debris collection apparatus can be selectively moveable by the positioner 107.

Figure 10:
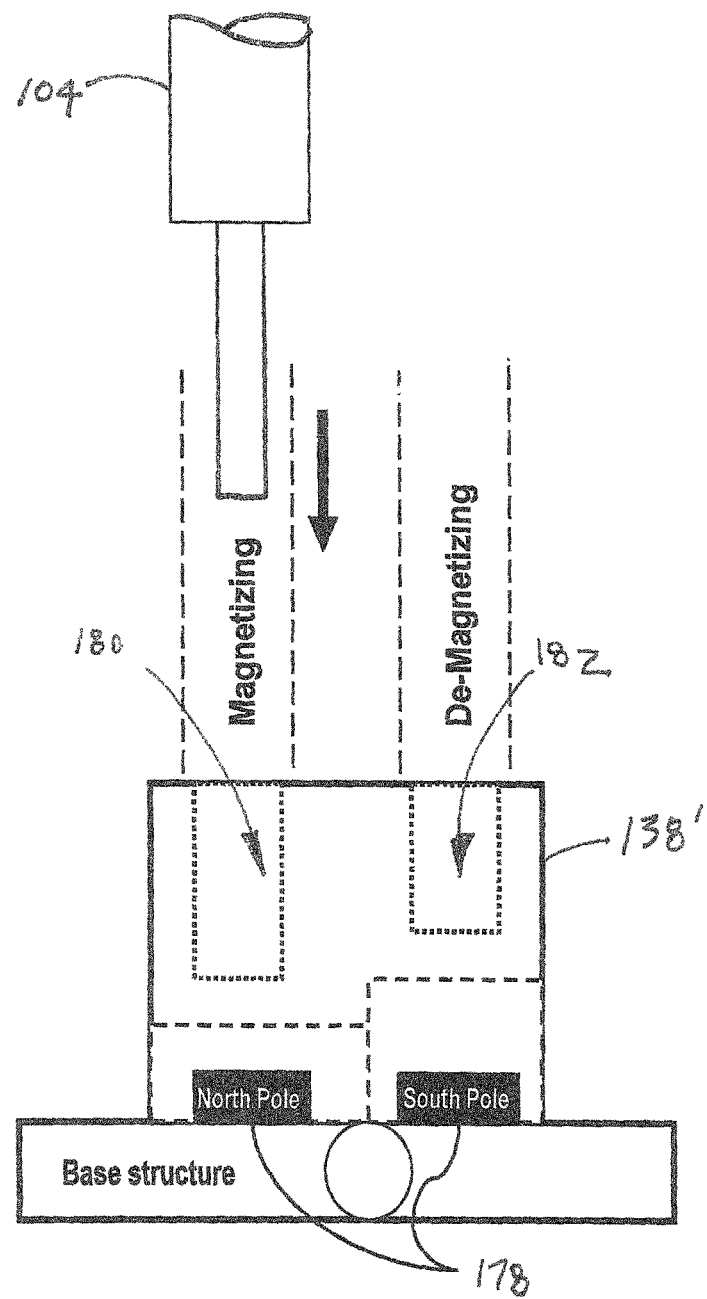
FIG. 10 is a diagrammatic depiction of a debric collection apparatus constructed in accordance with alternative embodiments of the present invention.

In alternative embodiments a less complex arrangement can be provided by replacing the electrical coil 142 with magnets to selectively magnetize and degauss the tool 104. FIG. 10 shows such illustrative embodiments in which the mounting block 138' supports a magnet 178. A passage 180 permits selectively moving the driver tool 104 into a coupling engagement with the north pole of the magnet 178 in order to magnetize it. Another passage 182 permits selectively moving the driver tool 104 into a coupling engagement with the south pole of the magnet 178 in order to degauss it.

Figure 11:
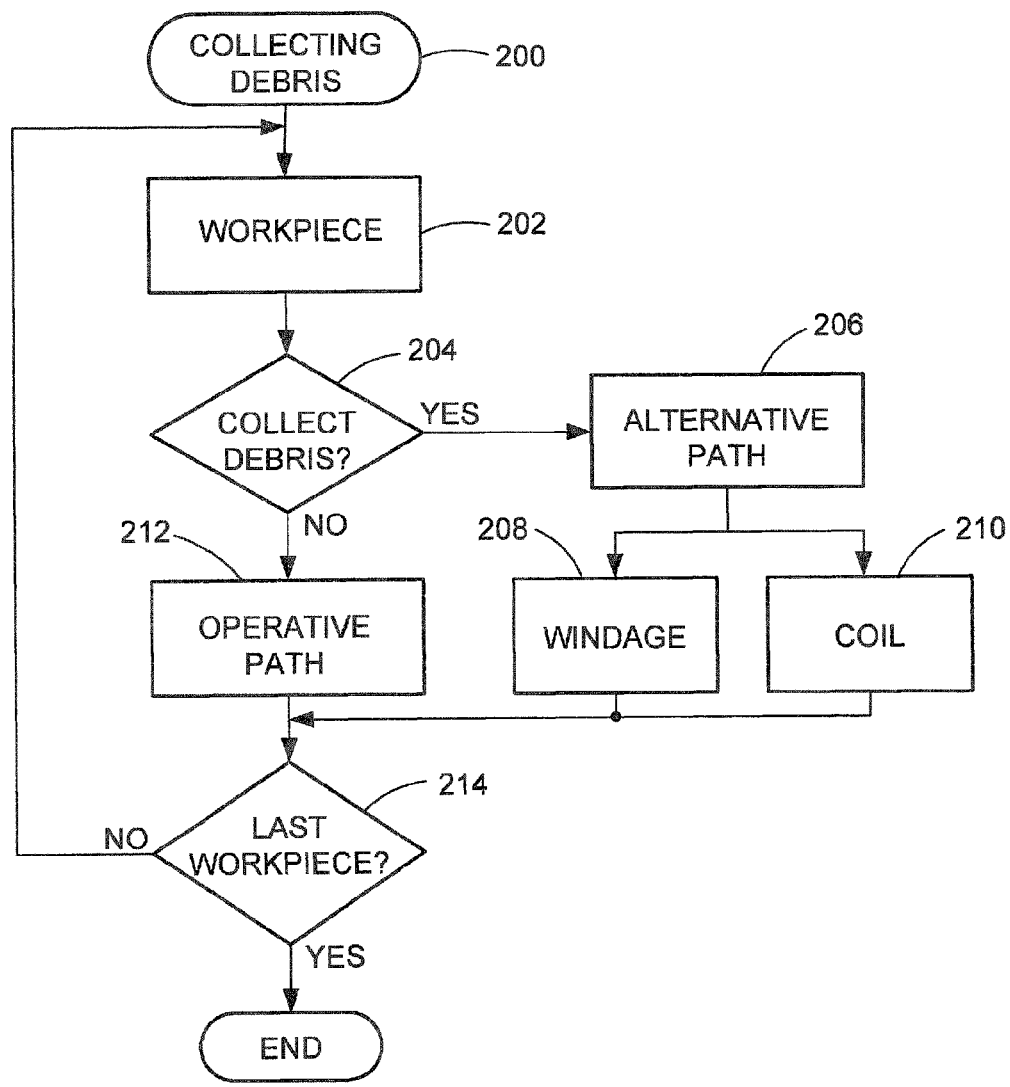
FIG. 11 is a flowchart depicting steps in a method for COLLECTING DEBRIS in accordance with embodiments of the present invention.

FIG. 11 is a flowchart depicting steps in a method 200 for COLLECTING DEBRIS in accordance with embodiments of the present invention. The method 200 begins in block 202 with the presentation of a workpiece for processing, such as by being conveyed into the workstation by the conveyor in the illustrative embodiments described. Block 204 determines whether debris should be collected from the driver tool, such as by way of receipt of a signal or a count signifying as such. If the determination of block 204 is yes, then in block 206 the alternative path of either the driver tool or the debris collection apparatus, or both, is called for to bring the two together in order to orient the tool at the predefined reference relationship to the channel in the illustrative embodiments. The windage source is activated in block 208 and the degaussing coil is activated in block 210 to demagnetize at least one of the driver tool and the debris and collect the debris from the driver tool, preferably independently of each other in relation to the position of the driver tool and/or the debris collection apparatus along their respective paths.

If the determination of block 204 is no, then in block 212 the operative path of the driver tool is called for to carry out processing steps on the workpiece. In either event, control then passes to block 214 where it is determined whether the last workpiece has been processed. If the determination of block 214 is yes, then the method 200 ends; alternatively, control returns to block 202 in relation to the next workpiece. As disclosed, the return path of the driver tool and/or the debris collection apparatus can be the reverse of the alternative path or it can be a different path.

Generally, the present embodiments contemplate a machine cell having an apparatus having a housing with a demagnetizer and connected to a windage source to collect debris from a tool, and means for controlling activation of the demagnetizer and the windage source in relation to a movement of at least one of the housing and the tool to collect the debris. For purposes of this description and meaning of the appended claims, the term "means for controlling" encompasses only the structure disclosed herein and structural equivalents thereof that are capable of executing written programming instructions stored in memory to perform the steps of the method of FIG. 10. Particularly, for example, "means for controlling" thus does not include previously attempted solutions requiring the tool to be manually manipulated or removed from its supporting structure to collect debris from it.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to machine cells in a manufacturing line, it will be appreciated by those skilled in the art that the claimed subject matter is not so limited and various other systems can utilize the present embodiments without departing from the spirit and scope of the claimed invention.

What is claimed:

1. An apparatus that is connectable to a windage source for collecting debris from a tool, the apparatus comprising:
    a housing defining a channel receiving the tool therein, at least one of the tool and the housing being selectively movable to operably orient the tool at a predefined reference relationship to the channel;
    a magnetic member surrounding the channel and tool therein, the member operable to demagnetize at least one of the tool and the debris when the tool is oriented at the predefined reference relationship;
    the channel operably connected in fluid communication with the windage source to establish a windage in the channel contacting the tool when oriented at the predefined reference relationship, the windage cooperating with the magnetic member to remove the debris from the tool; and a conduit connecting the windage source to the channel to collect the removed debris.

2. The apparatus of claim 1 wherein the magnetic member comprises an electrical coil.

3. The apparatus of claim 2 wherein the electrical coil is substantially concentrically disposed around the tool.

4. The apparatus of claim 2 further comprising a controller that selectively activates the electrical coil and the windage source in relation to a position of the at least one of the selectively movable the tool and housing along a path of travel.

5. The apparatus of claim 4 wherein the controller sequentially activates one of the electrical coil and windage source before the other one of the electrical coil and windage source.

6. The apparatus of claim 1 wherein at the operable orientation the channel is defined by a surface of the housing that establishes a close mating relationship adjacent the tool.

7. The apparatus of claim 6 wherein the close mating relationship is established by the housing defining a circular bore around a noncircular tool.

8. The apparatus of claim 1 wherein the windage source comprises a vacuum source.

9. The apparatus of claim 1 wherein the at least one of the selectively moveable tool and housing moves along a first path of travel to operably orient the tool at the predefined reference relationship to the channel in order to collect the debris, and wherein the at least one of the selectively moveable tool and housing moves along a different second path of travel to disorient the tool from the predefined reference relationship to the channel after the debris is collected.

10. The apparatus of claim 9 wherein the second path is a reverse of the first path.

11. The apparatus of claim 1 wherein the housing defines an inlet that admits the windage into the channel so that the windage flows substantially parallel to a longitudinal axis of the tool before contacting a distal end of the tool.

12. A method for collecting debris from a tool, the method comprising:

obtaining a debris collection apparatus having a housing that defines a channel sized to admit the tool;

moving at least one of the tool and the housing along a path of travel to orient the tool at a predefined reference relationship to the channel;

activating an electrical coil that is adjacent the channel to demagnetize at least one of the tool and the debris;

activating a windage source that is in fluid communication with the channel to establish a windage contacting the tool, the activating steps cooperatively removing the debris from the tool; and collecting the debris that is removed by the activating steps.

13. The method of claim 12 wherein the obtaining step is characterized by disposing the electrical coil annularly around the tool as a result of the moving step.

14. The method of claim 12 wherein the obtaining step is characterized by selectively controlling each activating step independently of each other and in relation to the moving step.

15. The method of claim 14 wherein the selectively controlling step is characterized by sequentially performing one of the activating steps before performing the other one of the activating steps.

16. The method of claim 12 wherein the obtaining step is characterized by establishing a close mating relationship between the housing and the tool at the predefined reference relationship orientation.

17. The method of claim 12 wherein the moving step is characterized by moving the at least one of the selectively moveable tool and housing along a first path of travel to operably orient the tool at the predefined reference relationship to the channel in order to collect the debris, and moving the at least one of the selectively moveable tool and housing along a different second path of travel to disorient the tool from the predefined reference relationship to the channel after the debris is collected.

18. The method of claim 17 wherein the moving step is characterized by the second path being a reverse of the first path.

19. The method of claim 12 wherein the activating a windage source step is characterized by admitting the windage into the channel so that the windage flows substantially parallel to a longitudinal axis of the tool before contacting a distal end of the tool.

20. An apparatus that collects debris from a tool, the apparatus comprising:

a housing receiving the tool therein, a demagnetizer surrounding the housing and tool therein, and connectable to a windage source in fluid communication with the housing; and means for controlling activation of the demagnetizer and the windage source in response to a movement of at least one of the housing and the tool such that the debris is collected from the tool when the demagnetizer and windage source are activated.

* * * * *